April 12, 1955     H. J. LEBHERZ     2,706,239
ELECTRIC BROILER
Filed Oct. 13, 1952     3 Sheets-Sheet 1
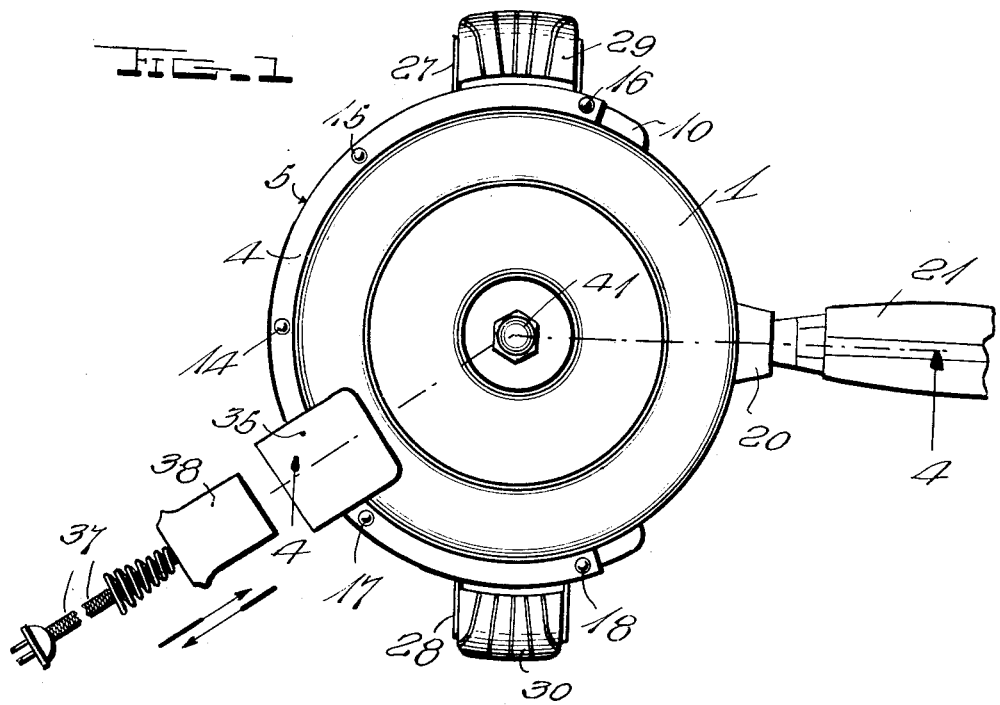
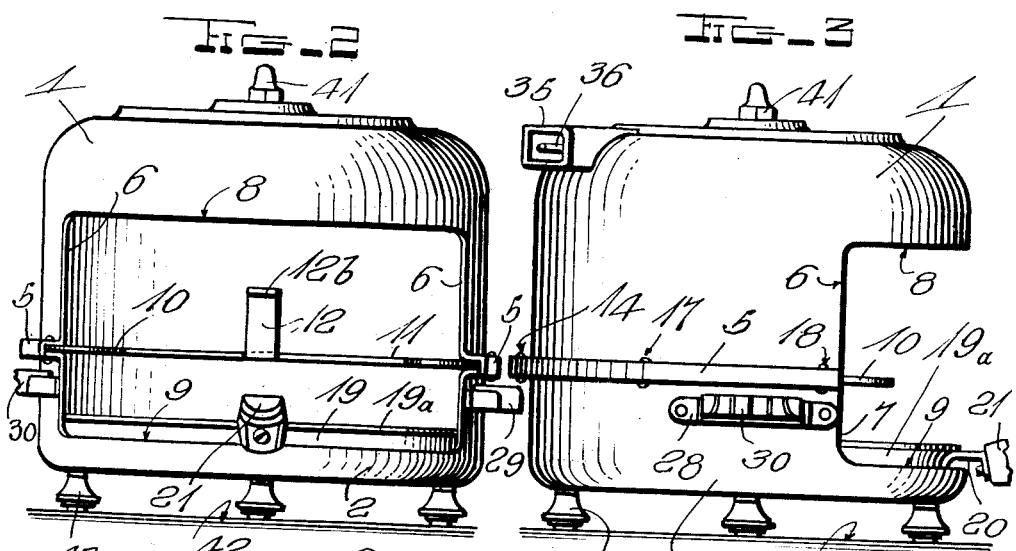
INVENTOR
Harry J. Lebherz,
BY
John C. Brady
ATTORNEY April 12, 1955  H. J. LEBHERZ  2,706,239
ELECTRIC BROILER
Filed Oct. 13, 1952  3 Sheets-Sheet 2
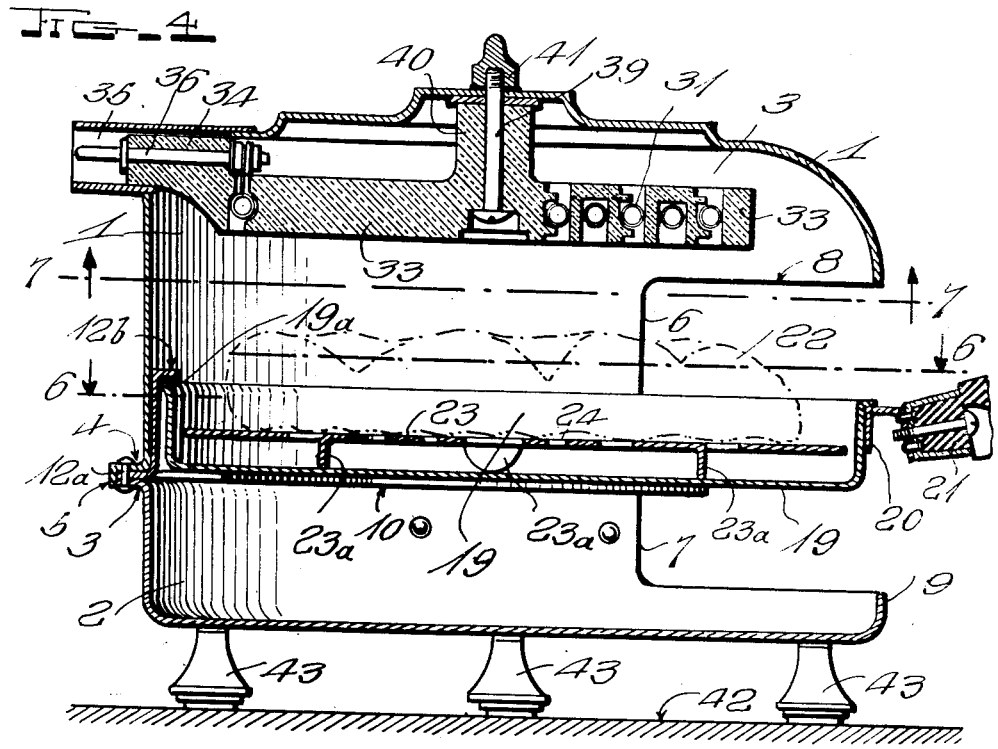
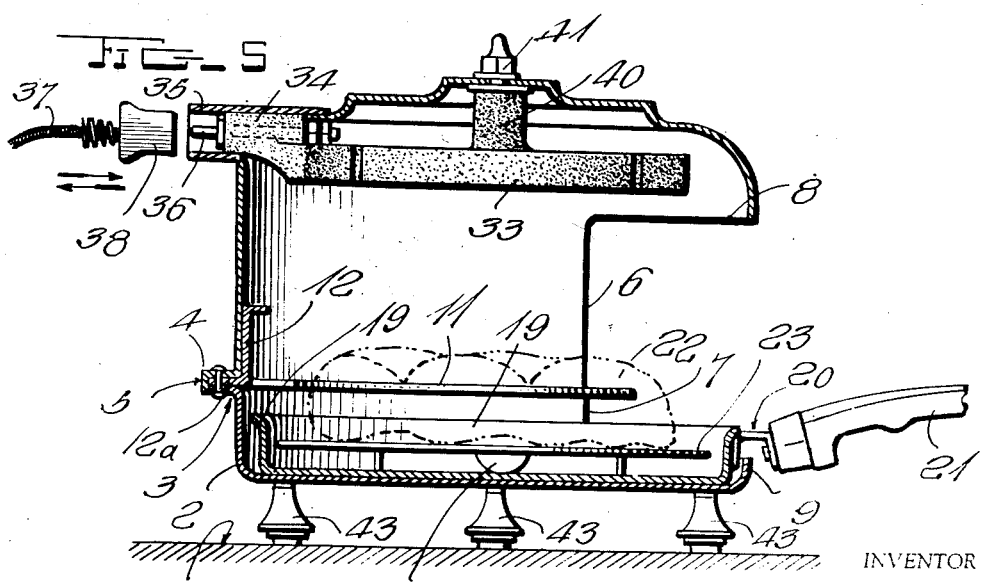
INVENTOR
Harry J. Lebherz,
BY
John G. Brady
ATTORNEY April 12, 1955    H. J. LEBHERZ    2,706,239
ELECTRIC BROILER
Filed Oct. 13, 1952    3 Sheets-Sheet 3
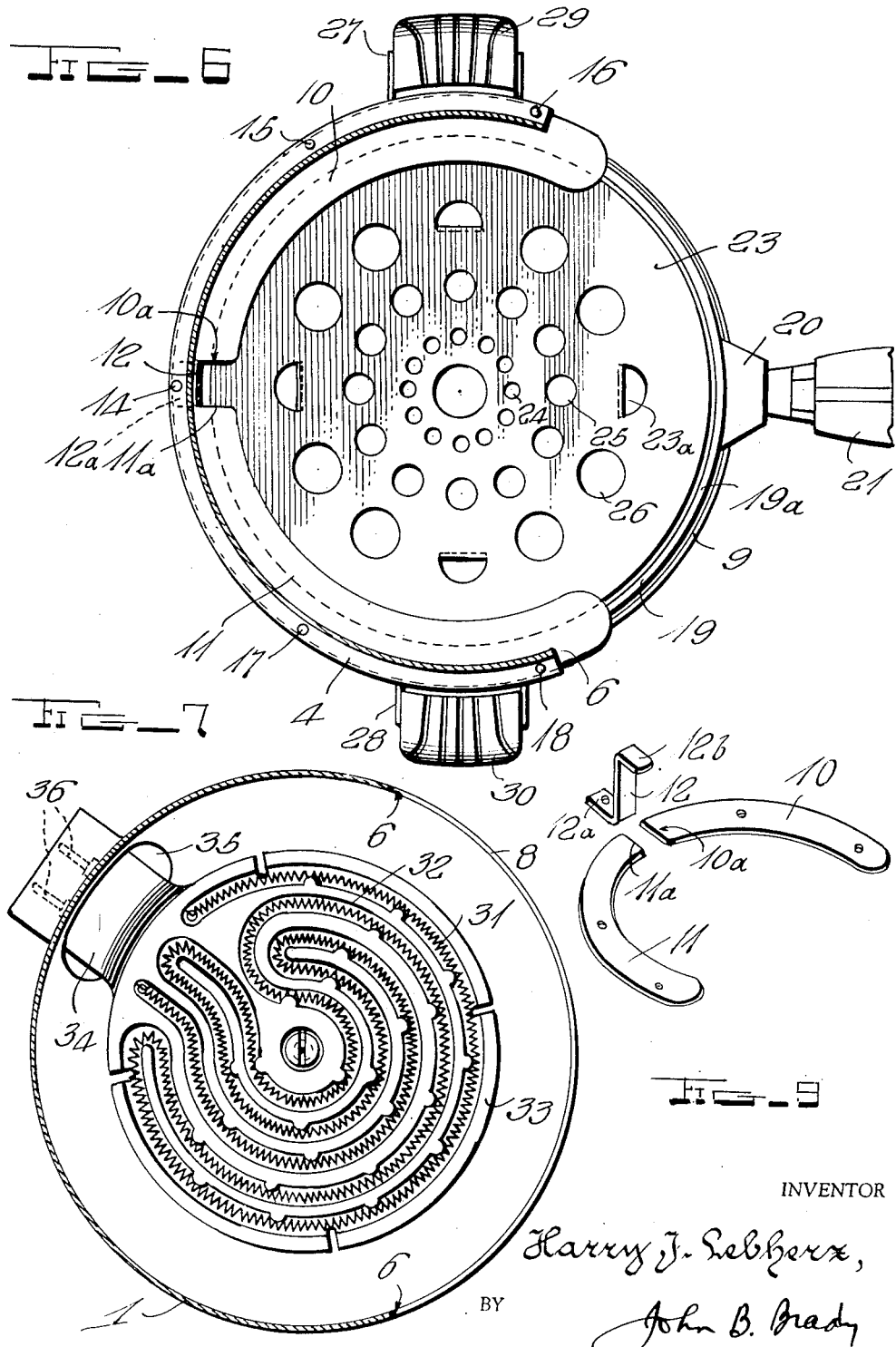
INVENTOR
Harry J. Lebherz,
BY
John B. Brady
ATTORNEY

United States Patent Office 2,706,239
Patented Apr. 12, 1955

2,706,239

ELECTRIC BROILER

Harry J. Lebherz, Frederick, Md., assignor to The Everedy Company, Frederick, Md., a corporation of Maryland Application October 13, 1952, Serial No. 314,489

9 Claims. (Cl. 219—35)

My invention relates broadly to cooking utensils and more particularly to an improved construction of electric broiler.

One of the objects of my invention is to provide an improved construction of electric broiler having means for positioning the broil pan at different radiation distances from the electric heating element within the broiler.

Another object of my invention is to provide construction of electric broiler including a closed cylindrical casing substantially enclosed throughout approximately 180 degrees of the cylindrical casing and open through the remaining distance for insertion and removal of the broil pan, including means for supporting and maintaining the broil pan at different distances from the radiating electric heater embodied in the broiler.

Still another object of my invention is to provide a construction of electric broiler including an enclosed substantially cylindrical casing open at one side thereof and provided with means positively supporting the broil pan at selected distances from the electric heating means positioned in the top of the casing.

Still another object of my invention is to provide an improved construction of electric broiler having an electric heating means in the top thereof and a shelf there beneath for supporting a broil pan in predetermined radiation distance from the electric heating means and including a clip for preventing the tipping of the broil pan during use.

Still another object of my invention is to provide an arrangement of electric broiler including a broil pan which may be selectively oriented within the broiler casing while in use for observing the condition of all parts of the food while broiling.

Other and further objects of my invention reside in the improved construction of a two-part casing for an electric broiler which may be readily assembled with a support there between for a broil pan as set forth in the specification hereinafter following, by reference to the accompanying drawings, in which:

Figure 1 is a top plan view of the electric broiler of my invention illustrating the electric service cord about to be connected with the appliance; Fig. 2 is a front view of the electric broiler shown in Fig. 1 and showing particularly the open side of the cylindrical casing through which the broil pan is inserted and removed; Fig. 3 is a side elevational view of the appliance shown in Figs. 2 and 3; Fig. 4 is a vertical sectional view taken substantially on line 4—4 of Fig. 1 and showing the broil pan supported on the horizontal shelf in position for receiving the radiation from the electric heater element within the top of the casing; Fig. 5 is a view similar to the view illustrated in Fig. 4 but showing the broil pan removed from the shelf and supported on the bottom of the casing; Fig. 6 is a horizontal sectional view taken on line 6—6 of Fig. 4; Fig. 7 is a horizontal sectional view taken on line 7—7 of Fig. 4; Fig. 8 is a perspective view of the trivet which is mounted in the broil pan for elevating the food above the bottom of the broil pan during the broiling operation; and Fig. 9 is a perspective view of the segmentally shaped members and the associated broil pan clip for maintaining the broil pan in position.

My invention is directed to a construction of electric broiler which may be manufactured from a minimum number of pressed metal parts for inexpensive manufacture on a mass production scale. I construct the broiler from two substantially cylindrical metallic parts which coact to form a substantially cylindrical casing open through approximately 180 degrees at one side thereof and closed for the remainder of the substantially cylindrical casing, the two parts interfitting to support a shelf there between for supporting and maintaining the broil pan in position. The two coacting parts constituting the substantially cylindrical casing are of differing depths, and anchored between the two parts I provide a clip operative to engage the edge of the broil pan for maintaining the broil pan in position when it is inserted in the casing and preventing accidental tipping thereof. To provide for this clip, I formed the shelf from two substantially segmentally shaped members terminating on opposite sides of the clip. The broil pan is proportioned so that it may be readily inserted through the open side of the casing and mounted upon the shelf formed by the segmentally shaped members and the edge of the broil pan engaged under the clip for preventing tipping of the broil pan while allowing orientation of the broil pan through a distance which is slightly less than approximately 180 degrees, enabling all parts of the food in the broil pan to be inspected and the broiling more readily accomplished.

Referring to the drawings in more detail, reference character 1 designates the top section of the electric broiler, while reference character 2 designates the lower section thereof. The top section 1 is approximately twice the depth of the lower section 2. The lower section 2 terminates in a laterally extending flange 3. The top section 1 terminates in a laterally projecting flange 4 which has a downwardly projecting substantially cylindrical rim 5 which envelops the peripheral edge 3 of the lower section of the cylindrical casing 2. The upper substantially cylindrical section 1 has an opening at one side thereof represented at 6 which is slightly less than 180 degrees. The lower section 2 has a similar opening 7 at one side thereof which is aligned with the opening 6, forming a partially open side for the appliance where the upper section 1 has a depending hood portion 8 and the lower section 2 has an upwardly extending rim portion 9. Intermediate the upper portion 1 and lower portion 2, I provide a pair of segmentally shaped shelf members 10 and 11. These segmentally shaped shelf members 10 and 11 project beyond the aligned openings 6 and 7 in the sides of the upper and lower portions 1 and 2 which form the enclosed casing and terminate in spaced relation at their adjacent ends indicated at 10a and 11a in Fig. 6. These segmentally shaped members 10 and 11 are supported on the horizontally extending flange 3 of the lower portion 2 of the casing and are engaged by the flange 4 of the upper portion 1 of the casing and the edge thereof enveloped by rim 5 of the upper portion 1 of the casing. Intermediate the adjacent ends 10a and 11a of the segmentally shaped members 10 and 11, I position the substantially Z-shaped clip shown at 12 where the base of the Z-shaped clip extends in a horizontal direction as represented at 12a and is secured between flange 3 of the lower portion 2 of the casing and flange 4 of the upper portion 1 of the casing by means of rivet 14 which passes through flanges 3 and 4 and is headed over externally thereof. Segmentally shaped members 10 and 11 are secured in position between flanges 3 and 4 in a similar manner by means of rivets 15, 16, 17 and 18 which also pass through both flanges 3 and 4 and the intermediate segmentally shaped members 10 and 11 there between and are headed over externally of the said flanges 3 and 4. Thus a sturdy, substantially cylindrical casing is provided for the electric broiler with a lateral shelf within the casing and a clip interiorly the casing for conjointly supporting and retaining the broil pan 19 in position. The broil pan 19 has a vertically extending side wall terminating in an outwardly flared rim 19a. The rim 19a is engaged inside the casing by the inwardly projecting top portion 12b of the substantially Z-shaped clip 12. The broil pan is provided with a handle supporting bracket 20 at one side thereof to which the heat insulated handle 21 is secured, enabling the broil pan 19 to be oriented on the segmentally shaped members 10 and 11 through an angle approaching 180 degrees and enabling the food represented at 22, supported on the trivet 23, to be readily inspected. The trivet 23 comprises a circular stamping of sheet metal having spaced feet struck therefrom in the form of lugs 23a forming mounting means for supporting the trivet 23 above the bottom of the broil pan 19 and elevating the food above the grease which may accumulate in the bottom of the broil pan. Concentric rows of apertures of different sizes, shown at 24, 25 and 26, are provided in the trivet to enable the grease to be drained from the food which is broiled.

The lower portion 2 of the casing is provided with brackets 27 and 28 extending in diametrically opposite directions therefrom and which support the handles 29 and 30 of heat insulation material.

The electric heating element is shown in the form of a coiled resistor 31 mounted in a circuitous recessed path 32 formed in the heat insulating refractory 33. The refractory 33 has an extension 34 at one side thereof which projects through the recess 35 in the top of the upper portion 1 of the casing. The projecting portion 34 forms a terminal block for mounting the terminals 36 which electrically connect with the heating coil 31. A power service cord is shown at 37 having connector 38 thereon adapted to engage the pin terminals 36 for supplying heating current to the coils 31. The refractory block of insulation material 33 is secured in the top portion 1 of the casing by means of bolt member 39 which extends through the refractory block 33 and through the spacing member 40 secured to the block and is fastened to the top portion 1 by the engaging nut 41. The heat is radiated downwardly from coils 31 for broiling the food such as meat 22 supported on the trivet 23.

The electric broiler of my invention may be used in pre-heating food with the broil pan on the bottom of the lower portion 2 as illustrated in Fig. 5 and may then be elevated to the shelf formed by segmentally shaped members 10 and 11 for broiling as represented in Fig. 4. After broiling, the broil pan may be removed and replaced upon the bottom portion 2 as illustrated in Fig. 5 for maintaining the food or meat warm. As heretofore pointed out, the substantially 180-degree orientation of the broil pan, while being retained against accidental tipping by clip 12, enables the meat or food to be readily inspected throughout the broiling operation.

The electric broiler is proportioned so that the upper casing member 1 has a depth which is substantially twice the depth of the lower casing 2. When joined at the juncture formed by the connection of the casing members 1 and 2 end to end, this proportion enables the broil pan to be located a safe distance from the electric heating means, either in the uppermost position of the broil pan, as illustrated at Fig. 4, or the lowermost position of the broil pan, as illustrated in Fig. 5. When the broil pan is supported in its lowermost position, accidental withdrawal of the broil pan from the lower casing 2 is prevented by the up-turned peripheral edge 9 of the lower casing member 2. As the broil pan is oriented for inspecting the food being broiled, the handle device constituted in part by bracket 20 and handle 21 is used to shift the position of the broil pan within limits fixed by the vertically extending edges of the aligned openings 6 and 7 in the upper and lower cylindrical sections 1 and 2. The handles 29 and 30 are symmetrically disposed in diametrically opposite positions extending externally from the lower casing member 2 and are so positioned that when the electric broiler is fully loaded, the mass in the broil pan and the mass formed by the electric heating device in the top of the upper casing member 1 are so distributed that the broiler remains in steady equilibrium when placed on a supporting surface such as 42 through the feet members of insulation material represented at 43.

While I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. An electric broiler comprising a two-part casing formed by upper and lower substantially closed cylindrical casing members, said casing members having aligned openings in one side thereof extending through a distance slightly less than 180 degrees, means connecting said casing members end to end, means fastened to said casing members by the aforesaid means and projecting into said casing for a peripheral distance of substantially one quadrant and forming a horizontal peripheral shelf within said casing, a broil pan slidable through the openings in said casing members above or below said shelf and supportable on the bottom of the lower casing member in a lowermost position and supportable on said shelf in an uppermost position, and an electric heating element supported in the top of the upper casing member for radiating heat downwardly in the direction of said broil pan in either of the positions thereof.

2. An electric broiler as set forth in claim 1 in which the means projecting into said casing comprises a pair of segmentally shaped members supported at their outer peripheries between said casing members.

3. An electric broiler as set forth in claim 1 in which the means projecting into said casing comprises a pair of flat segmentally shaped members supported at their peripheries between said casing members and extending into adjacent positions spaced from each other interiorly of said casing substantially at a mid-peripheral position thereof and means disposed at said mid-peripheral position forming a securing means for the broil pan when the broil pan is moved to a limiting position within said casing on the shelf formed by said segmentally shaped members.

4. A broil pan as set forth in claim 1 in which the means projecting into said casing are constituted by a pair of segmentally shaped members where the outer ends of the segmentally shaped members project beyond the aligned openings in said casing members and the inner ends of such segmentally shaped members terminate in spaced relation with respect to each other and means secured between said casing members and extending between the adjacent ends of said segmentally shaped members for engaging the edge of the broil pan when said broil pan is supported on the shelf formed by said segmentally shaped members.

5. An electric broiler as set forth in claim 1 in which the means projecting into said casing are constituted by a pair of segmentally shaped members peripherally secured between said casing members and terminating in spaced relation at substantially the mid-points of the casing members directly opposite the openings therein and a clip secured between said casing members and extending between the adjacent ends of said segmentally shaped members and having the end thereof projecting toward the interior of said casing and forming a retaining means for the broil pan when the broil pan is supported on the shelf constituted by said segmentally shaped members.

6. An electric broiler as set forth in claim 1 in which the means projecting into said casing comprise a pair of segmentally shaped members secured at their peripheries between the co-acting casing members and terminating at their inner ends in spaced relation in a position interiorly of said casing diametrically opposite the aligned openings in said casing members and a substantially Z-shaped member having one end thereof secured between the co-acting casing members and the other end thereof projecting into the interior of said casing and forming an engaging means for the broil pan when the broil pan is supported on the shelf constituted by said segmentally shaped members.

7. An electric broiler as set forth in claim 1 in which said broil pan is provided with a handle device projecting from one side thereof wherein said broil pan may be oriented within said casing through a horizontal distance limited by the abutment of said handle device with opposite edges of the openings in said casing members.

8. An electric broiler as set forth in claim 1 in which said upper casing member has a depth which is substantially twice the depth of said lower casing member, for controlling thereby the distance between the boil pan and the electric heating element in said upper casing member.

9. An electric broiler as set forth in claim 1 in which the junction between said upper casing member and said lower casing member is formed by a flange carried by said upper casing member and an integral downwardly extending peripheral rim and wherein said lower casing member is provided with a flange aligned with the flange on said upper casing member and in which said means projecting into said casing is secured between said flanges, the rim on said first-mentioned flange extending over the peripheral edge of said last-mentioned flange.

(References on following page)

References Cited in the file of this patent

UNITED STATES PATENTS

| | | | |
|---|---|---|---|
| 1,330,877 | Kuhn et al. | Feb. 17, | 1920 |
| 1,363,227 | Boyd et al. | Dec. 28, | 1920 |
| 1,612,468 | Reichold | Dec. 28, | 1926 |
| 2,055,972 | Fritsche | Sept. 29, | 1936 |
| 2,135,318 | Barkinsky et al. | Nov. 1, | 1938 |
| 2,156,860 | Lucas et al. | May 2, | 1939 |
| 2,188,757 | Moon | Jan. 30, | 1940 |
| 2,342,692 | Rehm | Feb. 29, | 1944 |
| 2,510,116 | Kaplan | June 6, | 1950 |